R. B. KILLIN.
Hand Seeder.
No. 65,578.
Patented June 11, 1867.
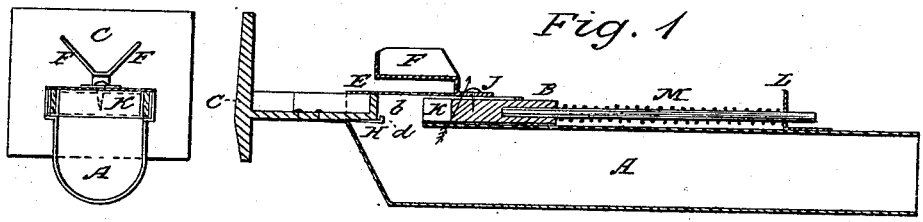
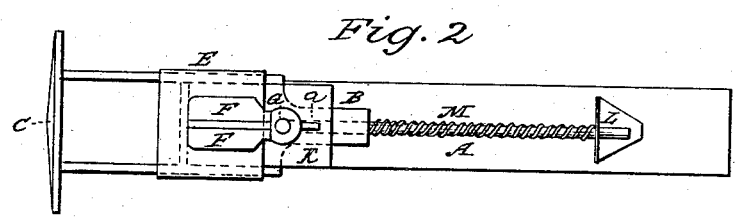
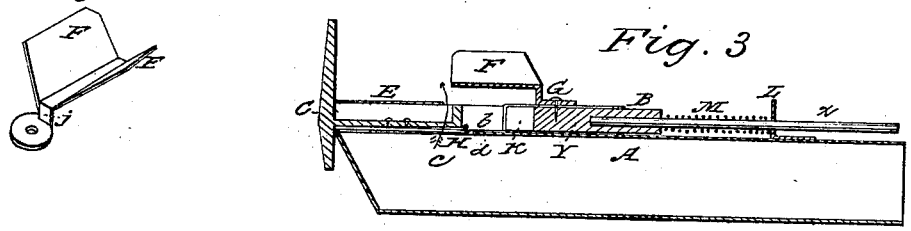
Witnesses:
Chas. F. Henderson
Geo. Lester
Inventor:
Robert B. Killin
per Job Abbott
atty

United States Patent Office.

ROBERT B. KILLIN, OF CANTON, OHIO.

Letters Patent No. 65,578, dated June 11, 1867.

---

CORN-DROPPER.

---

The Schedule referred to in these Letters Patent and making part of the same.

---

TO ALL WHOM IT MAY CONCERN:

Be it known that I, ROBERT B. KILLIN, of Canton, in the county of Stark, and State of Ohio, have invented new and useful Improvements in Corn-Droppers; and I do hereby declare that the following is a full, clear, and exact description of my invention, reference being had to the accompanying drawings, forming a part of this specification, and to the letters of reference marked thereon, of which drawings—

Figure 1 is a sectional view of dropper.
Figure 2 is a plan of the same.
Figure 3 is another sectional view, showing valve standard in another position.
Figure 4 is a cross-section of dropper.
Figure 5 is a perspective view of separator.

The nature of my invention consists in the attachment of a peculiarly constructed separator to the valve standard of the dropper in such a manner as that it may be used for preventing the seeds from falling together; or by being turned around or taken off the seeds may be allowed to fall more nearly together, as is desirable for small seeds; also in the use of a spring attached to the valve standard, which serves to completely prevent any small seeds from falling out when the valve standard is pushed up, which is a difficulty heretofore unsurmounted in machines of this class, i. e., seeding machines where the movement of the valve standard opens the orifice for discharge; lastly, in constructing the valve standard of two kinds of iron instead of making it wholly of malleable iron, as heretofore, whereby I increase its utility and lessen the cost.

To enable others skilled in the art to make and use my invention, I will proceed to describe its construction and operation.

The hopper A is made of tin or other suitable material, and is attached to the top of a hoe handle by wires passing through the hopper A and around the hoe handle, or in any other suitable manner. To the hopper A is attached the valve standard B by means of the pieces E and L, which serve as boxes or slides through which the valve standard moves, said standard being kept in position by the spring M. This valve standard is of novel construction, the rod X being made of round wrought iron, and is cast into the lower part, Y, which is of cast iron. In this manner a valve standard is formed, which by reason of the pliability of wrought iron can be corrected of any crooks which are liable to occur in usage, and is much stronger to bear usage than cast-iron valve standards, and much cheaper than malleable iron ones. The valve K is attached to the standard B by the screw G, and has the slotted hole $a$, by means of which the distance between the foot C and valve K and the quantity of seed discharged may be altered at pleasure. With the valve standard in position shown in figs. 1 and 2 and fig. 3, no seed can pass out, but when the hole $b$ comes into the line of the arrow $c$ the seed is free to pass out. The separator J, with flanges F F, shown in fig. 5, is placed on the valve K of the valve standard B, being held by the screw G. When in the position shown in figs. 1, 2, 3, and 4, the seeds in passing from the dropper are separated by falling on the flanges F F, and are caused to fall in proper position for covering. By loosening the screw G the separator J may be turned around or removed and the seeds allowed to fall near each other, which is desired in planting small seeds. The spring H is attached to the valve standard B, as shown, and the end $d$ presses on the sides of the hopper A, so that when the valve standard B comes into the position shown in fig. 3 the spring H covers the hole $e$, and no seeds can pass out.

I do not claim as my invention the hopper A, valve standard B, valve K, boxes or slides E and L, spring M, screw G, or foot-piece C, but what I do claim as my invention, and desire to secure by Letters Patent, is—

1. The separator J attached to the valve standard B, in the manner and for the purpose herein specified.
2. The spring H, attached to the valve standard of this or any other seeding machine, substantially in the manner and for the purpose herein set forth.
3. The mode of construction of the valve standard B, the rod X being made of wrought iron, and the part Y of cast iron, substantially in the manner and for the purpose herein specified.

ROBERT B. KILLIN.

Witnesses:
N. HOUCK,
E. N. BEEBOUT.